Figure 1:
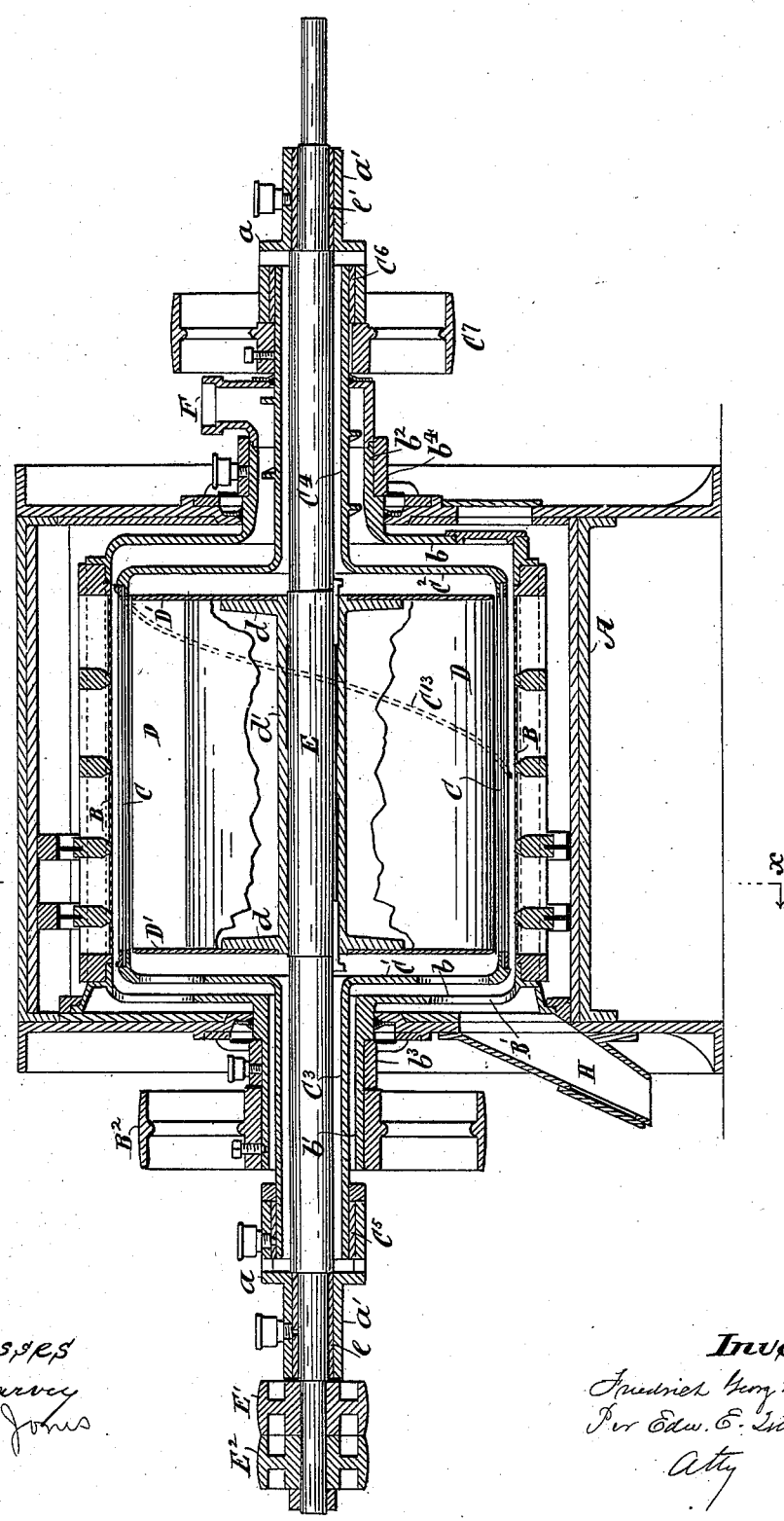

(No Model.) 7 Sheets—Sheet 2.
F. G. WINKLER.
ROTATING WAVE GENERATING SIFTER.

No. 400,620. Patented Apr. 2, 1889.

(No Model.)  7 Sheets—Sheet 3.

F. G. WINKLER.
ROTATING WAVE GENERATING SIFTER.

No. 400,620. Patented Apr. 2, 1889.

Witnesses
H. A. Harvey
A. M. Jones

Inventor
Friedrich Georg Winkler,
Par Edw. E. Lumly
Atty.

(No Model.) 7 Sheets—Sheet 4.
F. G. WINKLER.
ROTATING WAVE GENERATING SIFTER.

No. 400,620. Patented Apr. 2, 1889.

Witnesses
Inventor (No Model.) 7 Sheets—Sheet 5.

F. G. WINKLER.
ROTATING WAVE GENERATING SIFTER.

No. 400,620. Patented Apr. 2, 1889.

Witnesses.

Inventor.

(No Model.)  
7 Sheets—Sheet 6.
F. G. WINKLER.
ROTATING WAVE GENERATING SIFTER.
No. 400,620.  Patented Apr. 2, 1889.
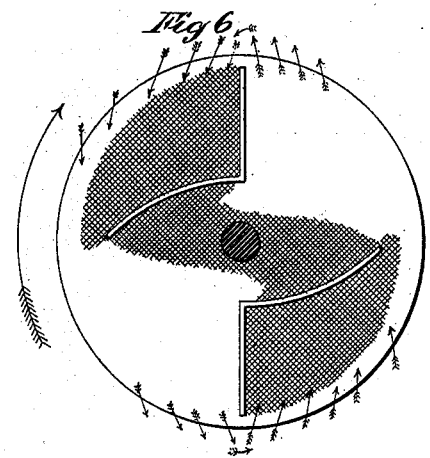
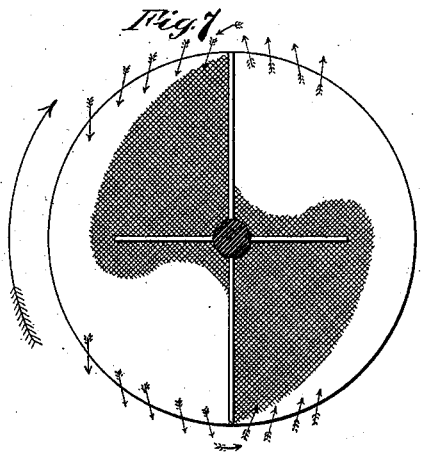
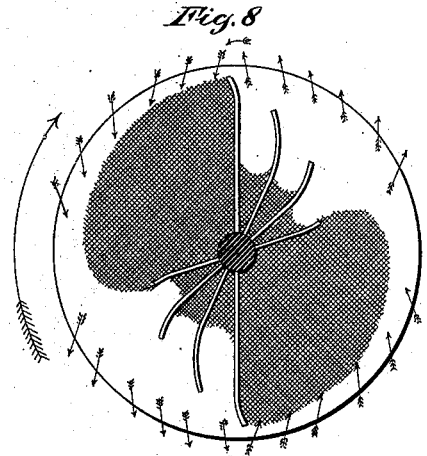
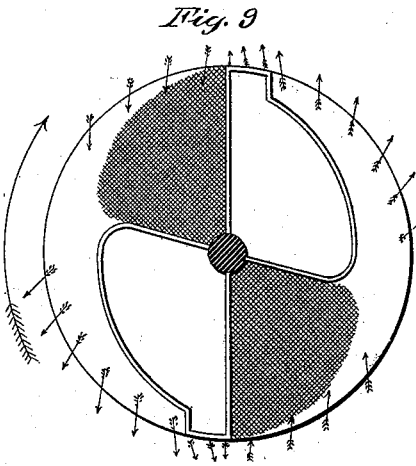
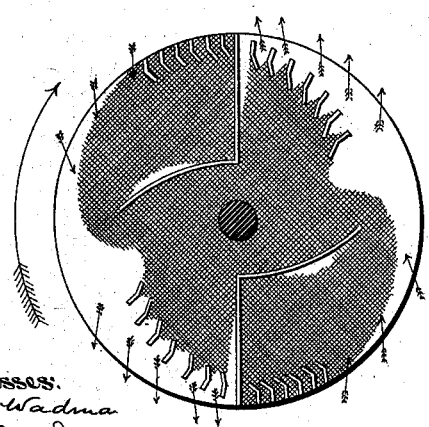
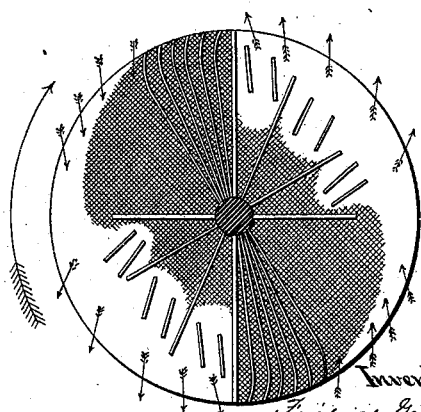

(No Model.) 7 Sheets—Sheet 7.

F. G. WINKLER.
ROTATING WAVE GENERATING SIFTER.

No. 400,620. Patented Apr. 2, 1889.

UNITED STATES PATENT OFFICE.

FRIEDRICH GEORG WINKLER, OF ZSCHOPPAU, SAXONY, GERMANY, ASSIGNOR TO ROBERT E. LESTER, OF NEW YORK, N. Y.

ROTATING WAVE-GENERATING SIFTER.

SPECIFICATION forming part of Letters Patent No. 400,620, dated April 2, 1889.

Application filed November 22, 1888. Serial No. 291,549. (No model.) Patented in Germany July 8, 1886, No. 40,357, and October 22, 1886, No. 39,709; in Sweden August 27, 1887, No. 1,627; in Luxemburg August 30, 1887, No. 883; in Norway September 1, 1887; No. 670; in France September 1, 1887, No. 170,762; in Belgium September 1, 1887, No. 78,748; in England September 1, 1887, No. 11,881; in Finland September 13, 1887, No. 293; in Italy September 30, 1887, No. 18,970; in Portugal November 3, 1887, No. 1,185; in Austria-Hungary February 13, 1888, No. 34,417; in Spain April 30, 1888, No. 12,425; in India May 1, 1888, No. 10, and in Argentine Republic May 30, 1888, No. 654.

*To all whom it may concern:*

Be it known that I, FRIEDRICH GEORG WINKLER, of Zschoppau, Saxony, Germany, have invented certain Improvements in Rotating Wave-Generating Sifters, of which the following is a specification.

These improvements relate to apparatus for subjecting flour, meal, or other granular materials fed into the interior of a hollow cylindrical sieve to the action of air-waves composed of radially outward and inward vibrations of small amplitude propagated progressively around the entire sieve-cylinder, according to the method described in another pending application serially numbered 247,765, filed August 24, 1887. The said apparatus consists, broadly, of a sieve-cylinder, a rotating wave-generator contained therein, and an annular system of deflecting-bars interposed between the inner surface of the sieve-cylinder and the path of motion of the wave-generator. The sieve-cylinder and the annular system of deflecting-bars can, either or both of them, be rotated or kept stationary. Preferably, the sieve-cylinder is rotated slowly, and the annular system of deflecting-bars is rotated at somewhat higher speed, while the wave-generator is rotated with great velocity.

Figure 2:
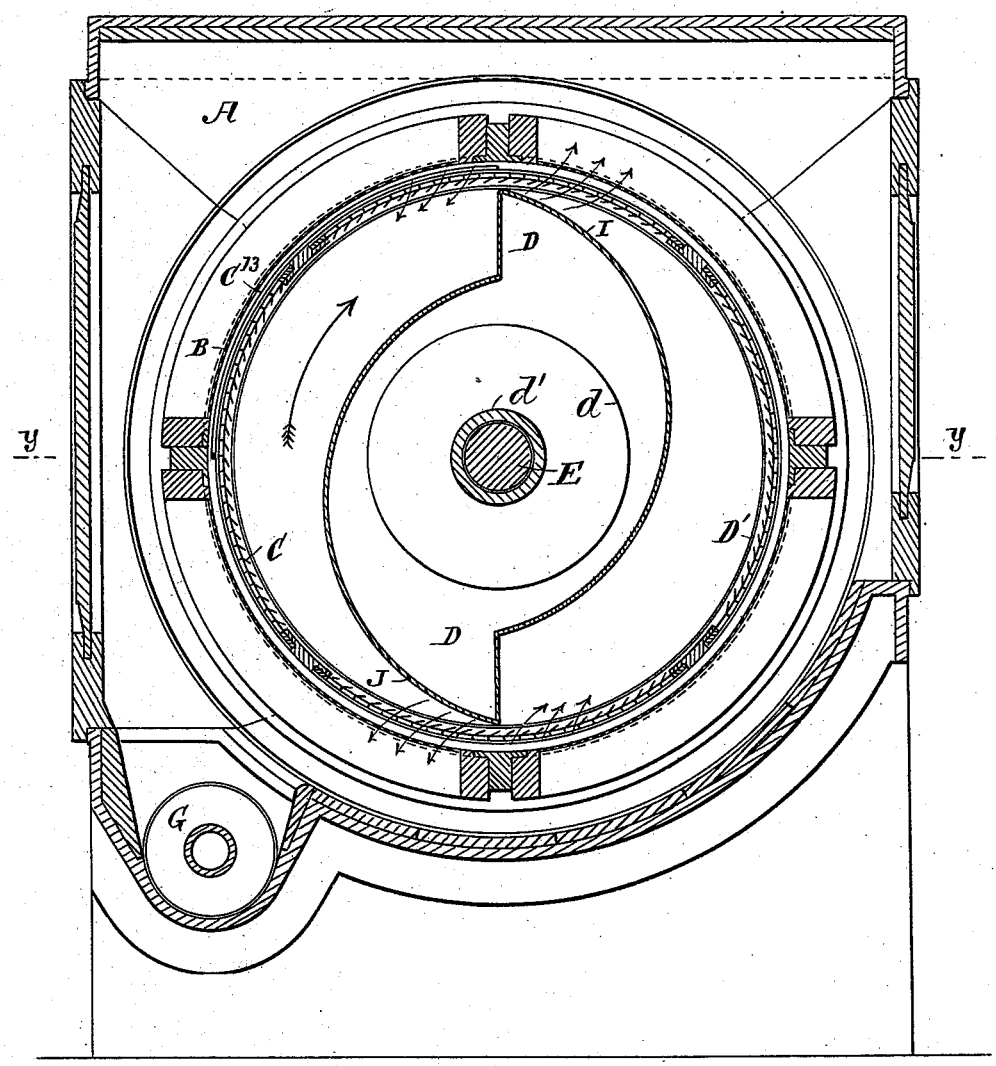
Figure 3:
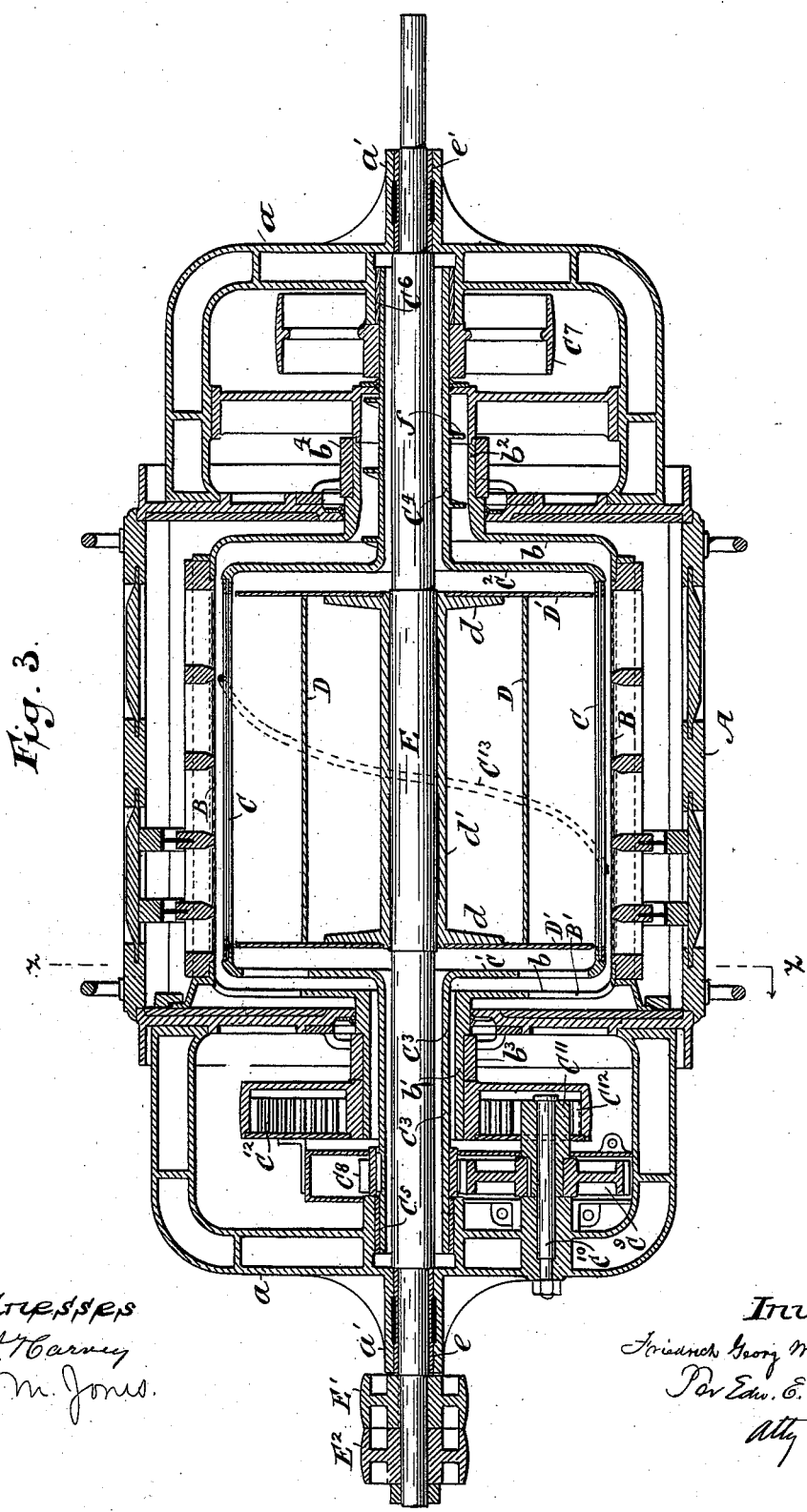
Figure 4:
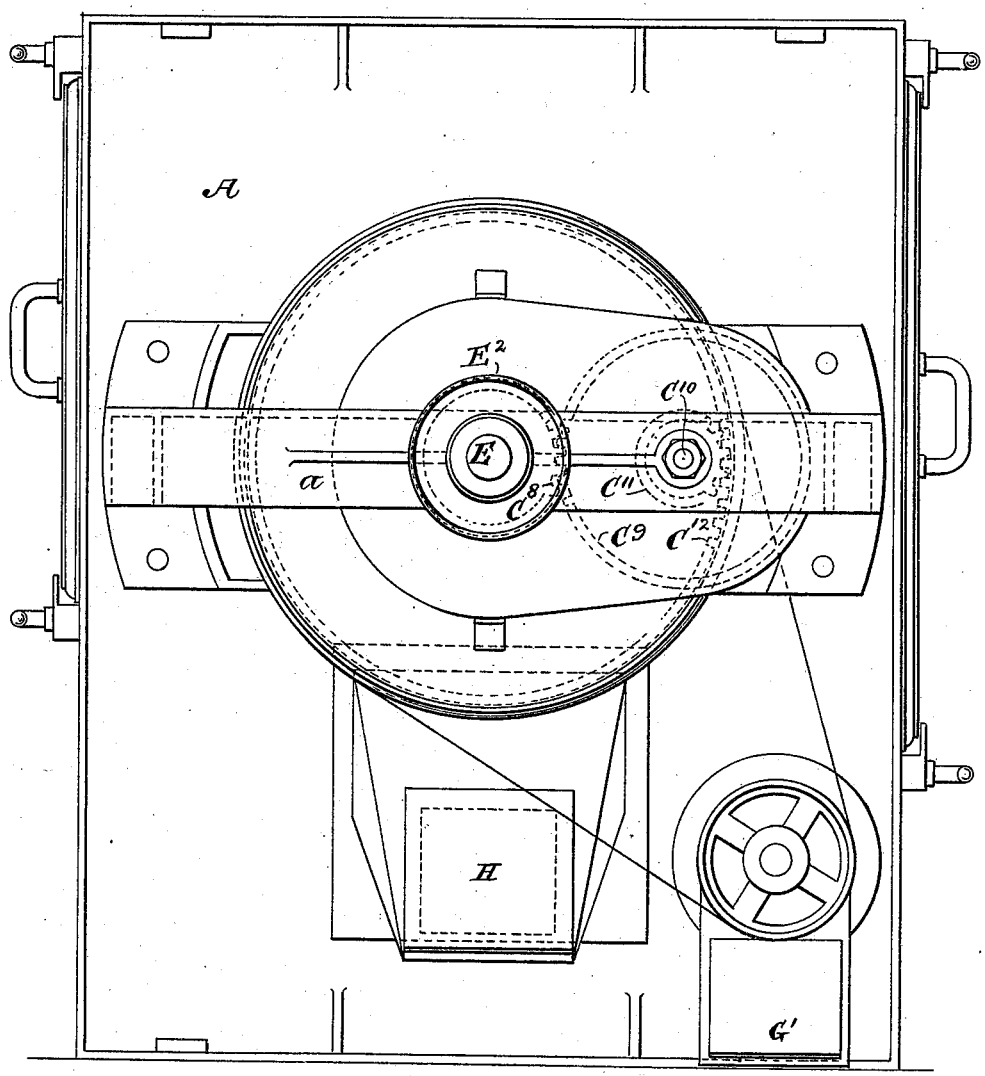
Figure 5:
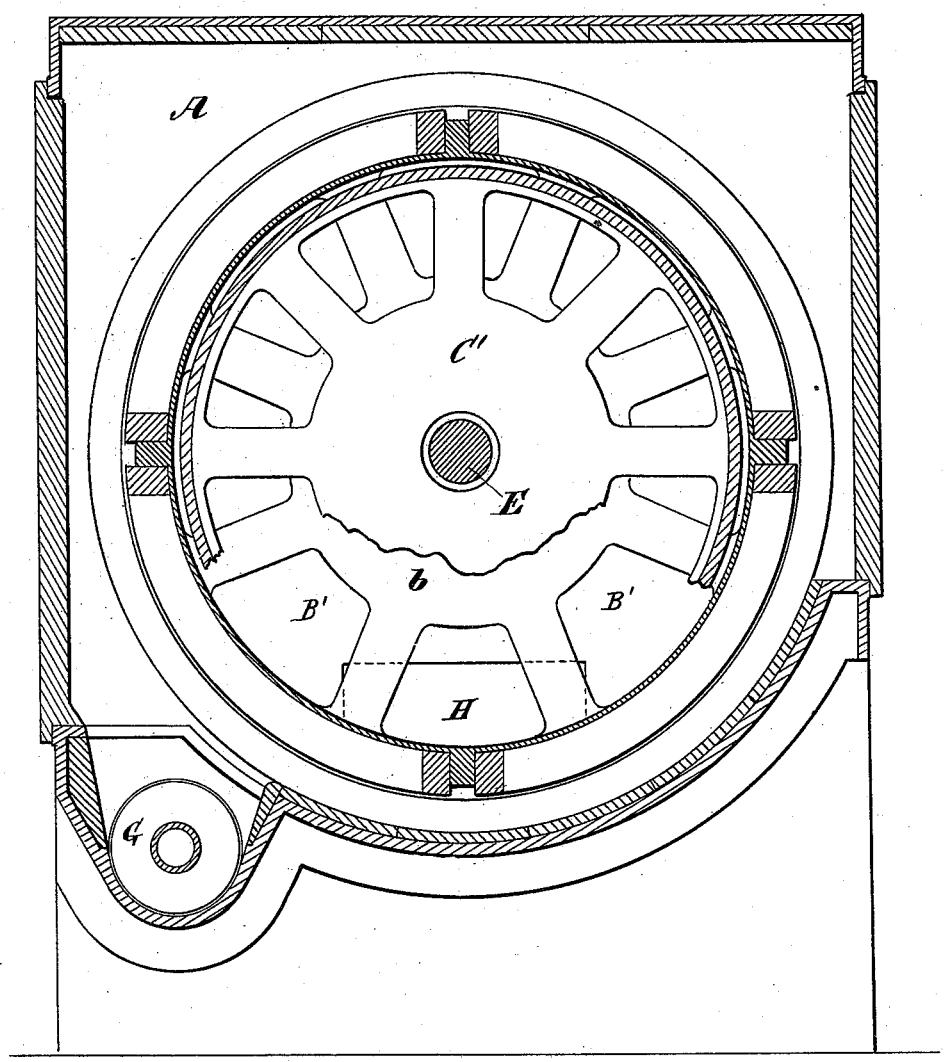
Figure 12:
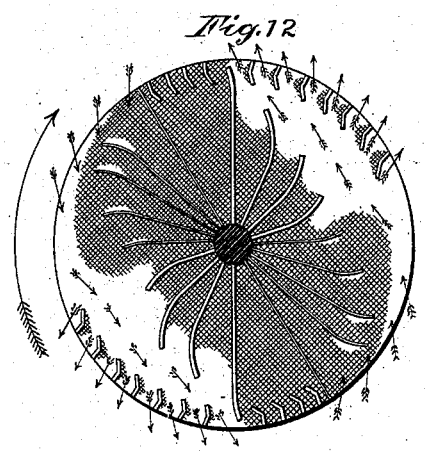
Figure 13:
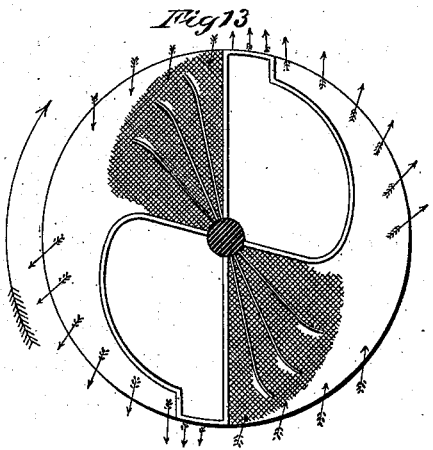

The accompanying drawings, representing a flour-bolting machine containing the invention and some of the many modifications in the forms of the fans which may be employed in rotating wave-generators, are as follows:

Figure 1 is a central longitudinal section of a flour-bolting machine, and showing a pulley for rotating the cylindrical sieve. Fig. 2 is a transverse vertical section taken through the plane indicated by the line $x\ x$ on Fig. 1. Fig. 3 is a longitudinal horizontal section taken through the plane indicated by the line $y\ y$ on Fig. 2, but showing intermediate gearing for rotating the cylindrical sieve. Fig. 4 is an end elevation. Fig. 5 is a transverse vertical section taken through the plane indicated by the line $z\ z$ on Fig. 3. Figs. 6, 7, 8, 9, 10, 11, 12, 13, 14, 15, 16, and 17 are transverse sections of various forms of rotating wave-generating fans.

The drawings represent a bolting-chest, A, to the opposite ends of which are affixed the gear-frames $a\ a$. Within the bolting-chest is a preferably-rotating drum, the curved surface of which is principally composed of a sieve or bolting-cloth, B. Within the sieve-drum is a rotating cylindrically-arranged system of deflecting-bars, C.

Within the cylindrically-arranged system of deflecting-bars is a rapidly-rotating wave-generator consisting of fans D D, fastened at their opposite ends, respectively, to the two heads or disks $D'\ D'$, which are respectively secured to the flanges $d\ d$ of a hollow shaft, $d'$, keyed to the rapidly-revolving shaft E. The shaft E is journaled at its opposite ends, respectively, in the boxes $e\ e'$, carried in the hollow bosses $a\ a'$, cast on the ends of the gear-frames $a\ a$. The heads $b\ b$ of the sieve are provided, respectively, with the hollow hubs $b'\ b^2$, journaled in the boxes $b^3\ b^4$, which derive their support from the gear-frames, respectively.

The system of deflecting-bars C is supported upon the peripheries of two parallel disks, $C'\ C^2$, which are provided, respectively, with the hollow hubs $C^3\ C^4$. The hollow hubs $C^3\ C^4$ extend through the hubs $b'\ b^2$ and are journaled in the boxes $C^5\ C^6$, carried upon the gear-frames. The hollow hubs $b'\ b^2$ are of sufficiently large diameter to afford considerable clearance for the hollow hubs $C^3\ C^4$, which in turn are made of large enough diameter to afford ample clearance for the swift-running shaft E. It is not absolutely essential that the sieve-drum should rotate; but it is desirable in order to secure the uniform wear of the bolting-cloth.

The shaft E is provided at one end with the fast and loose pulleys $E'\ E^2$ for engaging the belt which drives the wave-generator. The pulley $C^7$, affixed to the hollow hub $C^4$, drives the rotating system of deflecting-bars, and a spur-wheel, C⁸, affixed to the hub C³, engages and drives a pinion, C⁹, affixed to a counter-shaft, C¹⁰, provided upon its inner end with the spur-wheel C¹¹, which engages the gear C¹², affixed to the hub b' of the sieve-drum, as shown in Figs. 1, 2, 3, and 4.

In practice the sieve-drum will be driven at the rate of from, say, twenty to thirty revolutions per minute, the system of deflecting-bars at from one hundred to two hundred revolutions per minute, and the wave-generator at from five hundred to eight hundred revolutions per minute.

The meal or other material to be sifted is introduced into the feed-chute F, through which it falls into the interior of the hollow hub b', from which it is conveyed, by means of the spiral-screw blade f, affixed to the hub C⁴, into the space between the head b of the sieve-drum and the disk C², down which it falls to the interior surface of the bolting-cloth. A blade, C¹³, affixed to and extending spirally around the exterior surface of the system of deflecting-bars, serves to gradually move the meal longitudinally along the inner surface of the bolting-cloth. The flour sifts through the meshes of the bolting-cloth, and is carried by means of a screw-conveyer, G, to the flour-discharge chute G'. The bran, gradually moved along the interior surface of the bolting-cloth, finally escapes through the opening B' in the head b into the bran-discharge chute H.

As the sifting operation is performed merely by the vibratory motions of the air induced by the wave-generator, the flour is discharged through the flour-chute G and the bran is discharged through the bran-chute H without any accompanying outward currents of air. The total quantity of air in the bolting-chest remains unchanged, and the flour and bran are discharged therefrom simply by their own gravity. The sifting effect will be best promoted by stretching the bolting-cloth tightly, so that it will not participate in the vibratory movements of the air induced by the wave-generator.

The wave-generator illustrated in Fig. 2 generates two waves. The compressed air in front of the advancing fan-surfaces I and J is driven outward, as indicated by the longer arrows, from comparatively small portions of the periphery of the wave-generator, and air to supply the places of the quantities thus ejected is drawn inward, as indicated by the shorter arrows, through comparatively large portions of the periphery of the wave-generator.

As the quantity of air supplied to the area of rarefaction is precisely the same as the quantity of air expelled from the area of condensation, it will be perceived that the pressure of the outward current is necessarily much greater than the pressure of the inward current.

By enlarging the diameter of the wave-generator a larger number of fans may be employed, and thus a larger number of waves may be simultaneously generated. Ordinarily, however, it will be sufficient to employ a double wave-generator—that is, a generator with two fans generating two waves simultaneously, respectively, on opposite sides of the generator.

Wave-generators, so far as regards the forms and positions of their fans, are susceptible of almost infinite variation. Examples of a few of the possible modifications are represented in cross-section in Figs. 6 to 17, both inclusive.

Each of the double wave-generators, like the single wave-generator, consists of two parallel disks affixed to a rotating shaft and united to each other by longitudinal partitions, which in some cases are flat, in others curved, and which in some cases extend from the shaft outward toward the periphery and in other cases are united along one or both of their longitudinal edges. In all these figures the direction of rotation is indicated by a long concentrically-curved arrow, the areas of rarefaction are approximately indicated by net-works of shade-lines, and the approximate directions of the induced vibratory air-currents are indicated by the short arrows in each figure.

It will be seen that in all the forms of wave-generators shown there are established cells or spaces extending longitudinally across the wave-generator, which cells are open only toward the periphery, and hence that in all cases the partial vacua established in parts of the rotating structure by the centrifugal ejection of portions of the compressed air in front of the advancing fan-surfaces can only be supplied by air which enters at the periphery in the rear of the advancing fan-surfaces. Therefore the wave-generators are instrumentalities which propagate in a circular path air-waves composed of outward vibration of comparatively large amplitude and inward vibrations of comparatively small amplitude as distinguished from centrifugal fans such as heretofore known, which operate to produce a blast of air by constantly ejecting from the periphery air which is drawn in at the ends of the rotating structure. It will hence be seen that the essential characteristic of what is herein termed a "wave-generator" is that the longitudinal spaces or cells with which it is provided, irrespective of their shape in cross-section, shall be open only toward the periphery of the rotating structure.

Figure 14:
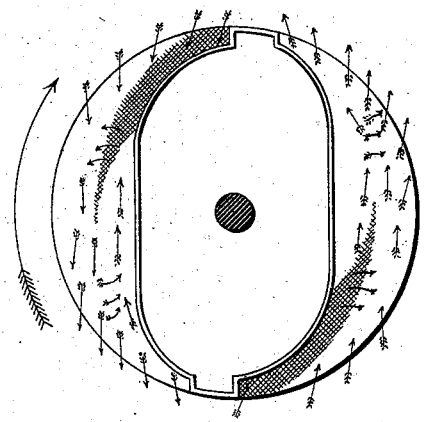
Figure 15:
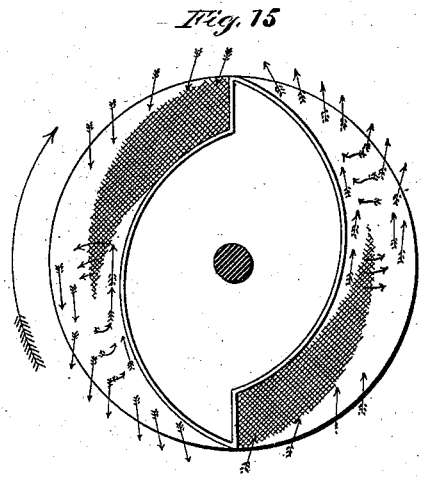
Figure 16:
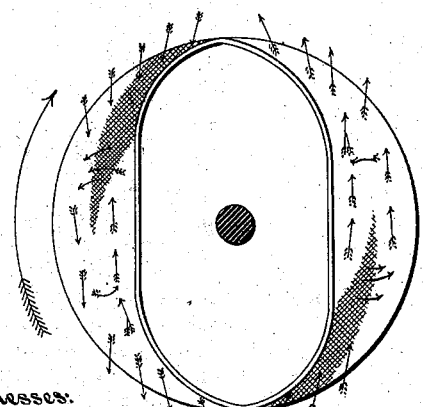
Figure 17:
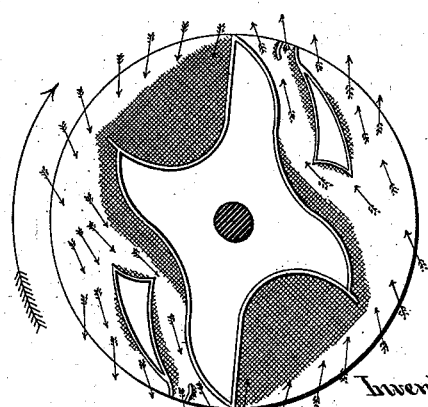

It is to be remarked that as a rule the amplitude of the air-vibrations will increase or decrease accordingly as the speed of rotation of the wave-generator is increased or decreased; and it is also to be observed that in wave-generators in which the fans are composed simply of radial or nearly radial partitions, as illustrated in Figs. 6, 7, and 8, there will be a tendency of the air expelled from the forward side of the fan to turn immediately over the outer edge of the fan and inward into the space behind the advancing fan. This difficulty, however, can be overcome by increasing the speed of rotation of the generator. It may also be overcome by the employment of a group of fan-blades in comparatively close proximity to each other, as illustrated in Fig. 11, or by the employment of a concentrically-curved shield having its forward edge connected with the outer edge of the next adjoining partition, as illustrated in Fig. 14. By either of these expedients the area of rarefaction is removed so far to the rear of the area of extreme condensation that the current of compressed air is ejected against the sieve without loss of pressure. To such an extent is this the case that to produce outward currents of air of given pressure the form of generator illustrated in Fig. 7 will require to be rotated at from two and a half to three times the speed of the generator illustrated in Fig. 11.

In practice a wave-generator twenty-two inches in diameter, having the form illustrated in Fig. 2, has been found to be peculiarly effective when used in a scalper and rotated at a speed of from three hundred to seven hundred revolutions per minute. It will be understood that in the scalper the flour, of relatively high specific gravity, is separated from the bran, which is of relatively low specific gravity. When the wave-generator illustrated in Fig. 2 is employed in machines for sifting flour, it is rotated at a speed of from one thousand to fifteen hundred revolutions per minute. These examples are here given merely for the purpose of practical illustration.

The principles governing the construction of wave-generators are those which have been described. The principle to be observed in operating them consists in so regulating their speed of rotation that the outward current ejected through a comparatively small area of the sieve will have just sufficient pressure to force the finer material through the meshes, so that at the same time the quantity of air required to supply the place of that thus ejected will enter the generator through a comparatively large area of the sieve, and hence at such low pressure on the exterior of this comparatively large area of the sieve that there will be no danger of causing the sifting material to adhere to and clog the exterior of this portion of the sieve.

It will thus be seen that this invention is not limited to any particular arrangement of fans in a wave-generator, but is present in any cylindrical sieve in which there is employed a wave-generator having the essential characteristics of construction and mode of operation herein described.

In the drawings the cylindrically-arranged system of deflecting-bars, which, for the sake of brevity, may be called the "deflecting-grate," is represented as composed of angle bars or slats.

The invention is not limited to the use of a deflecting-grate composed of angle-bars such as shown, but is equally present if the deflecting-grate be composed of bars which are parallel or approximately parallel with the axis of the rotating structure, irrespective of the shape of the bars in cross-section. The presence of these bars, as has been explained, prevents the establishment of circular currents of air immediately within the cylindrical sieve by deflecting in radial directions the currents of air ejected by the rotating fans.

Instead of employing intermediate gearing, as illustrated in Figs. 3 and 4, for transmitting motion to rotate the sieve from the shaft $C^4$ of the rotating deflecting-grate, the hollow hub $b'$ of the disk $b$ of the rotating sieve may be provided with the pulley $B^2$, and may thus be driven by the belt independently of the rotating deflecting-grate.

It will be seen that by throwing the belt off the pulley $B^2$ the sieve will remain stationary, and it will also be seen that the deflecting-grate may be rotated or not, according to whether the belt is applied to the driving-pulley $C^7$. Thus either or both the deflecting-grate and the sieve may be rotated or not, as may be desired.

What is claimed as the invention is—

1. The combination, in a sifting-machine, of a hollow cylindrical sieve, a rotating wave-generator within said sieve, and an annularly-arranged system of deflecting-bars interposed between the path of motion of the wave-generator and the interior surface of the said cylindrical sieve, substantially as set forth.

2. The combination, in a sifting-machine, of a hollow cylindrical sieve, a rotating wave-generator within said sieve, and a rotating deflecting-grate composed of an annularly-arranged system of deflecting-bars interposed between the path of motion of the rotating wave-generator and the interior surface of the said cylindrical sieve, substantially as set forth.

3. The combination, in a sifting-machine, of a rotating hollow cylindrical sieve, a rotating wave-generator within said sieve, and an annularly-arranged system of deflecting-bars interposed between the path of motion of the wave-generator and the interior surface of the said cylindrical sieve, substantially as set forth.

4. The combination, in a sifting-machine, of a rotating hollow cylindrical sieve, a rotating wave-generator within said sieve, and a rotating deflecting-grate composed of an annularly-arranged system of deflecting-bars interposed between the path of motion of the wave-generator and the interior surface of the said cylindrical sieve, substantially as set forth.

5. The combination, with a hollow cylindrical sieve, of a rotating wave-generator consisting, essentially, of two parallel disks affixed to a central shaft and of partitions or fans extending longitudinally across the wave-generator from one of said disks to the other, whereby there are established in said generator longitudinal spaces or pockets open only toward the periphery of the wave-generator, substantially as set forth.

FRIEDRICH GEORG WINKLER.

Witnesses:
ROBERT E. LESTER,
A. M. JONES.